United States Patent [19]

He et al.

(10) Patent No.: US 7,269,729 B2
(45) Date of Patent: Sep. 11, 2007

(54) RELATIONAL DATABASE MANAGEMENT ENCRYPTION SYSTEM

(75) Inventors: Jingmin He, Cortland Manor, NY (US); Sriram Padmanabhan, Briarcliff Manor, NY (US); Min Wang, Cortland Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 743 days.

(21) Appl. No.: 10/036,196

(22) Filed: Dec. 28, 2001

(65) Prior Publication Data

US 2003/0123671 A1 Jul. 3, 2003

(51) Int. Cl.
*H04L 9/00* (2006.01)
*G06F 11/30* (2006.01)
*G06F 7/04* (2006.01)

(52) U.S. Cl. .................. 713/166; 713/190; 713/193; 380/279; 380/280

(58) Field of Classification Search ................ 713/166, 713/164, 150, 168, 156; 380/282, 280; 707/1
See application file for complete search history.

(56) References Cited

U.S. PATENT DOCUMENTS

2003/0046572 A1* 3/2003 Newman et al. ............ 713/193

FOREIGN PATENT DOCUMENTS

JP 2003271438 A * 9/2003

OTHER PUBLICATIONS

I. Wassim, A. Kayssi, and A. Chehab, "An enterprise policy-based security protocol for protecting relational database network objects", International Conference on Communications and Mobile Computing, pp. 343-348, Jul. 2006.*
U.S. Appl. No. 60/315,900, filed on Aug. 30, 2001.*

* cited by examiner

*Primary Examiner*—Matthew Smithers
*Assistant Examiner*—Courtney D Fields
(74) *Attorney, Agent, or Firm*—F. Chau & Associates LLC

(57) ABSTRACT

Disclosed is a method of internally encrypting data in a relational database, comprising the steps of providing a security dictionary comprising one or more security catalogs, receiving data from a user associating said data with a database column and at least one authorized user, generating a working encryption key, internally encrypting said working encryption key using a public key from an authorized user, storing said encrypted working key in a security catalog, and using said working key to internally encrypt said data.

18 Claims, 3 Drawing Sheets

RELATIONAL DATABASE MANAGEMENT ENCRYPTION SYSTEM

FIELD OF THE INVENTION

The present invention is related to the field of database security, and, more particularly, to methods for encrypting data in relational database management systems.

BACKGROUND OF THE INVENTION

Relational DataBase Management Systems (RDBMS) now play a major role in e-business. Vast quantities of business data are gathered, stored and processed, which demands more powerful support from backend RDBMS servers. However, current RDBMS systems do not support true and secure data encryption.

There are several database products that support weak data encryption, all of which use loose coupling. That is, data are first encrypted outside the database engine and then loaded into the database. Consequently, the stored encrypted data cannot be processed efficiently by the database engine itself, losing the advantage of using an RDBMS to manage the data in the first place.

The major problem with the loose coupling approach is that encrypted data is dead data (from a query processing point of view) inside the database and is resurrected to life only after it is fetched back out and decrypted. This makes query processing almost impossible, and efficient database techniques such as indexes cannot be used at all.

Another problem with current RDBMS is that some users have too much power to access any data. For example, a system administrator or a database administrator can access and modify data that are owned by other people without any restriction.

What is needed is a system that integrate encryption and decryption with the relational database so that one may have both the benefits of encryption and all the benefits of a relational database.

SUMMARY OF THE INVENTION

Disclosed is a method of internally encrypting data in a relational database, comprising the steps of providing a security dictionary comprising one or more security catalogs, receiving data from a user, associating said data with a database column and at least one authorized user, generating a working encryption key, internally encrypting said working encryption key using a public key from an authorized user, storing said encrypted working key in a security catalog, and using said working key to internally encrypt said data.

Another aspect of the invention further comprises the step of generating a private key needed to decrypt said encrypted working key.

In another aspect of the invention said public key is a password and is used by the system to look up said private key.

In another aspect of the invention said step of associating said data with a database column and a user is accomplished with an extended SQL syntax and further comprises the step of creating a relational database object comprising the identity of said authorized users, a relational database table, the identity of said column within said relational database table, one or more security flags, said flags indicating user privileges to access said data.

In another aspect of the invention said working key is provided by a user.

In another aspect of the invention said working key is randomly generated.

Another aspect of the invention further comprises the steps of receiving a query and private key from a user, checking the ownership of an encrypted column using said security catalog to verify the user is authorized, internally decrypting said encrypted working encryption key with said private key, internally decrypting said encrypted column with said working key, processing said query, and returning an answer to said query to the user.

Disclosed is a program storage device readable by machine, tangibly embodying a program of instructions executable by the machine to perform method steps for internally encrypting data in a relational database, said method steps comprising providing a security dictionary comprising one or more security catalogs, receiving data from a user, associating said data with a database column and at least one authorized user, generating a working encryption key, internally encrypting said working encryption key using a public key from an authorized user, storing said encrypted working key in a security catalog, and using said working key to internally encrypt said data.

Another aspect of the invention further comprises the step of generating a private key needed to decrypt said encrypted working key.

In another aspect of the invention said public key is a password and is used by the system to look up said private key.

In another aspect of the invention said step of associating said data with a database column and a user is accomplished with an extended SQL syntax and further comprises the step of creating a relational database object comprising the identity of said authorized users, a relational database table, the identity of said column within said relational database table, one or more security flags, said flags indicating user privileges to access said data.

In another aspect of the invention said working key is provided by a user.

In another aspect of the invention said working key is randomly generated.

Another aspect of the invention further comprises the steps of receiving a query and private key from a user, checking the ownership of an encrypted column using said security catalog to verify the user is authorized, internally decrypting said encrypted working encryption key with said private key, internally decrypting said encrypted column with said working key, processing said query, and returning an answer to said query to the user.

DETAILED DESCRIPTION OF PREFERRED EMBODIMENTS

A detailed description of the invention will now follow. Such description will illustrate the idea and methods of the invention for encryption in relational database management systems.

The approach of the invention is to add encryption as an internal database feature so that data can be stored in encrypted form and can also be processed efficiently and securely. In this invention, encryption becomes part of the RDBMS. Because efficient database techniques such as indexes and query optimization are integrated together with the encryption function, the efficiency of the RDBMS remains available to the user.

Figure 1:
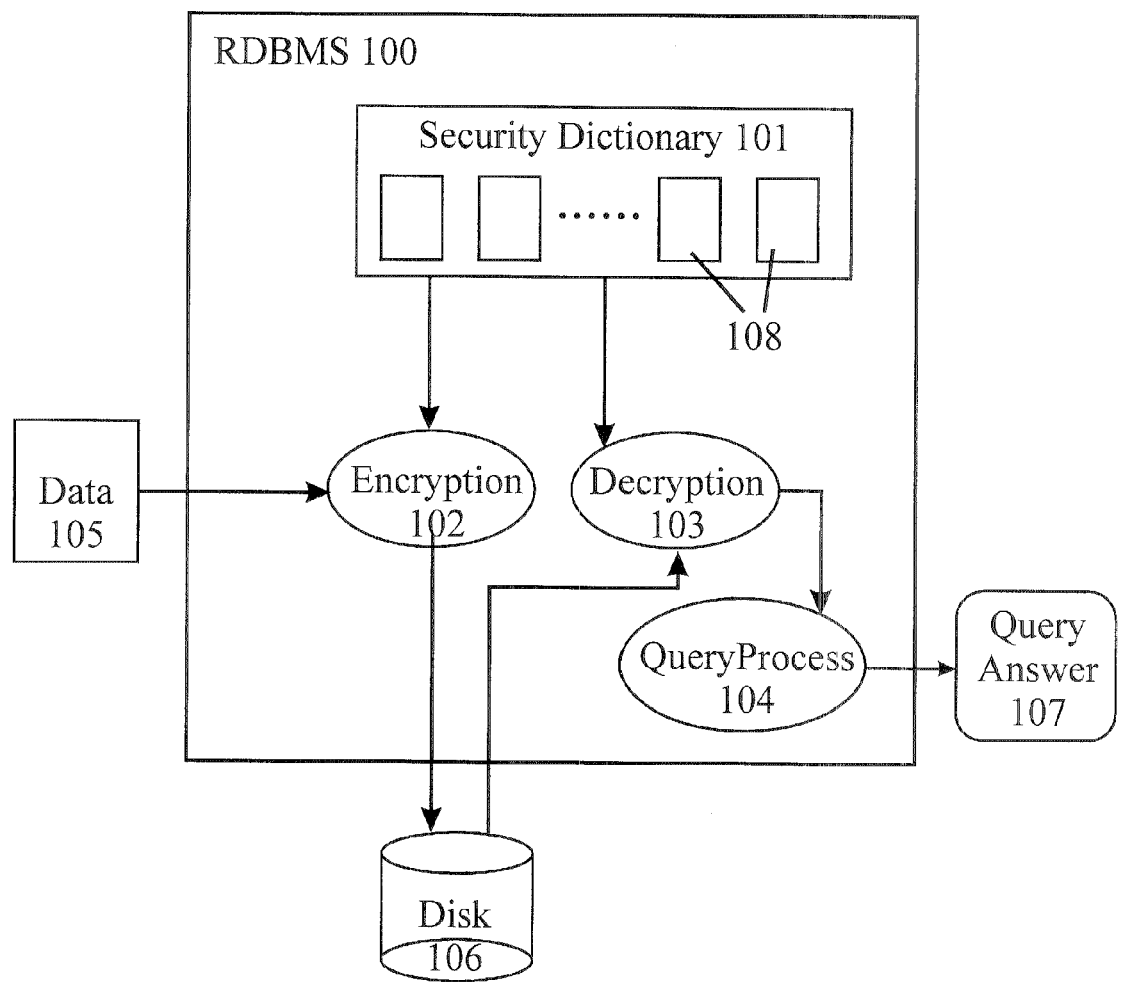
FIG. 1 is the functional block diagram of a RDBMS that support encryption.

Referring to FIG. 1, a relational database management system 100 comprises a security dictionary 101, encryption 102 and decryption 103 processes, and a query process 104. The RDBMS 100 is in data communication with storage media 106 and is adapted to receive data 105 for storage in the database from outside the database and to output data, such as answers 107 to database queries to the outside. The security dictionary 101 comprises one or more security catalogs 108.

Security Dictionary and Security Catalogs

A traditional data dictionary stores all of the information that is used to manage the objects in a database. A data dictionary comprises one or more catalogs. In this invention, a security catalog 108 is like a traditional system catalog but with two security properties: (a) It can never be updated manually by anyone, and (b) Its access is controlled by a strict authentication and authorization policy.

One example would be a table SEC_USER that records user account information. Some columns in the table store security-related information and are called security columns (or security fields). Each security field has a corresponding security flag field that specifies how the field value can be accessed (particularly updated). For example, a password field could be a security field, and its security flag could be set to "updatable by anyone with appropriate access privilege to the SEC_USER table", "updatable by the defined user only", or "never updatable by anyone". In the second case, only the user himself can change his own password.

A security dictionary 101 comprises all the security catalogs 108.

The implementation of the security dictionary 101 is flexible. One approach is to implement it within a database server. The server internally controls the access to the security dictionary based on some system security configuration that is derived from an enterprise security policy, which is not necessarily done by a database administrator. Another approach is to implement the security dictionary 101 as a service outside of the database server.

The integrity of secure catalogs 108 can be well maintained. First of all, the access to a security field is preferably strictly controlled by its corresponding security flag, and its content cannot be modified until the security flag is first changed. Second, a security flag can be put under the control of an Secure Operating Environment (SOE), such as a smart card or security coprocessor. Or, a security policy can be established that does not allow the change of a security flag after it is first created. Third, the hash value of a security column (or even the security flag column) can be computed and stored in an SOE so that any accidental change (e.g., caused by physical disk damage) can be detected.

Secure User Management

It is preferred that a user should have total control over his own secret data. For example, only the user would be able to change his password. Other people can change a user's password only if they are authorized to do so. In a database system, a database administrator can reset a user's password upon the user's request, probably because the user might have forgotten his password. However, the database administrator should not be allowed to change, even temporarily, a user's password without being detected by the user.

By using a security catalog, no one is able to manipulate other users' important security information, and no one can impersonate other users without being detected and caught. When a database administrator creates a user account, besides specifying the usual account information, he must also specify some security characteristics (whether and how this account can be modified) so that a specific security policy is associated with this account. All the account information is stored in a security catalog table SEC_USER that may comprise the following columns, among others:

userid: User login name. No one is allowed to change this field.

auth_type: How this user is authenticated. Possible values: db, os, sc (smart card), or any other supported authentication methods.

auth_flag: Security flag, indicating if other users are allowed to update auth_type field of this record. Possible values: yes, no, or never.

passwd: Hash value of password.

passwd_flag: Security flag for passwd, indicating if other users are allowed to update passwd field of this record. Possible values: yes, no, or never.

updateby: The userid who updated the passwd field most recently.

The default user for any SEC_USER record is the user whose identifier is specified in the userid field. The auth_flag (security flag) field takes three possible values: yes, no, or never. Value "yes" means anyone with the privilege to access the table SEC_USER can update this record; "no" means only the default user has the update privilege; "never" means no one (including the default user) can update the record.

Figure 2:
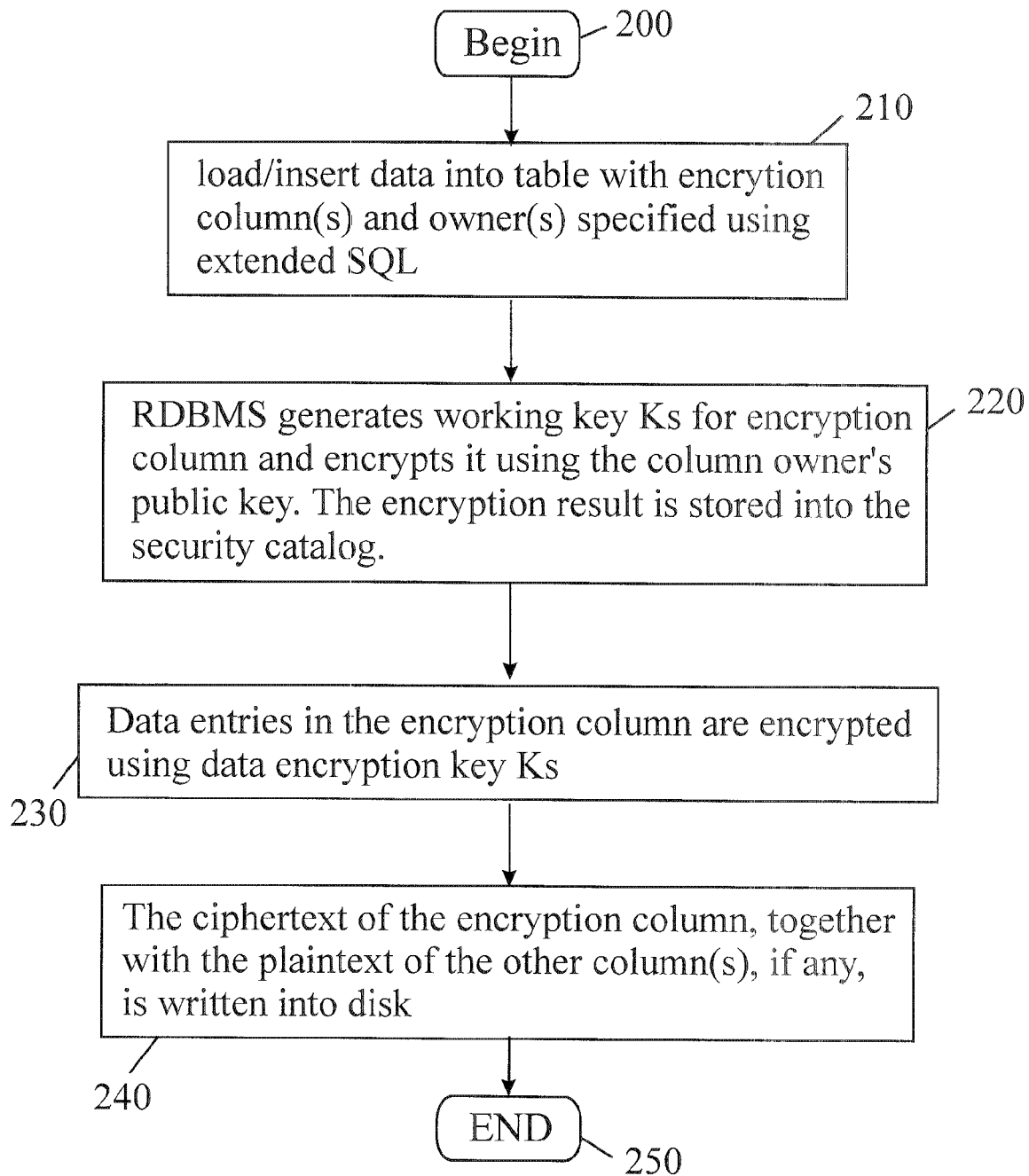
FIG. 2 is a flow diagram of the encryption of data.

Let us consider a concrete example. Suppose a database administrator creates an account for user Alice by running the following SQL statement:

CREATE USER Alice
IDENTIFIED BY db UPDATE never
PASSWORD "mypass" UPDATE no;

The statement creates a user with userid "Alice" and the newly created user will be authenticated by database password "mypass". The only way Alice can login is to use the database password and the authentication method cannot be changed. No one except Alice herself can change her login password. The security portion of the SEC_USER record for Alice might comprise the following information, among others:

(Alice, auth_type=db, auth_flag=never, passwd=H("mypass"), passwd_flag=no, updateby="")

where H is a hash function and an empty updateby field means this record is newly created. Alice can change her password if a password utility is provided, or she can do so by using the following SQL statement:

ALTER USER Alice
IDENTIFIED BY db
PASSWORD "newpass";

The server will check the identity of the command issuer (Alice) against the SEC_USER record for the user specified in the statement (Alice) and decide if the command is authorized. Because the passwd_flag value is "no" which means Alice herself can update her own password, the command is executed and Alice will have a new database password. However, if a database administrator (assuming he's not Alice) issues the above statement, after checking the record for Alice in SEC_USER, the server knows the change is not authorized and thus the command is rejected. In case the passwd_flag value for Alice is "never", even Alice Specify Encryption in Table Definition Referring to FIG. 2, when defining a table, a user may specify explicitly that he wants the content of some columns to be encrypted when the data are loaded. He can do this by issuing the following extended SQL CREATE TABLE statement:

CREATE TABLE Customer
(userid INT PRIMARY KEY
lastname varchar(25),
firstname varchar(25),
ccnum char(16) ENCRYPTION UPDATE no);

which corresponds to node 210 of FIG. 2. Whenever a credit card number is inserted into the table, it will be encrypted (by the database server) first and the encrypted version will be stored in the database. Suppose Alice is the creator (and thus the owner) of table Customer. We need a new security catalog SEC_ENCRYPTION. Whenever a user creates a database object that is to be encrypted, a corresponding record is created in SEC_ENCRYPTION. Each catalog record specifies a database object, its owner (the object creator), and a security flag that indicates how the object is to be updated. There is also an updateby field that store the identifier of the user who updated this record most recently. The pair (owner, object) forms a primary key. For example, for the above CREATE TABLE statement, the following record is inserted into SEC_ENCRYPTION:

(Alice, table "Customer", column "ccnum", enc_flag, updateby=Alice)

The enc_flag specifies whether any user can update the record, and can take the values "yes, "no" or "never". The value "yes" means any user with the privilege to access table Customer can change the definition of the ccnum column; "no" means only Alice (the owner) can change the definition of ccnum; "never" means nobody can make the change. In the above example, only Alice can change the definition of column ccnum (e.g., she can drop the encryption requirement for this column). Before any database object is altered, the security dictionary will be checked first. If the change violates the security specification for that object, the change request will be rejected. For example, if a database administrator wants to change the definition of column Customer (ccnum) by issuing the following SQL statement:

ALTER TABLE Customer MODIFY ccnum DROP ENCRYPTION;

the command will be rejected because the SEC_ENCRYPTION record for Customer shows that Alice is the owner of the table and only the owner can change the definition of column ccnum. However, if it is Alice who issues the above statement, the change will be made. Now consider, when the column definition changes, what about those credit card numbers that were already inserted and stored in encrypted form? There are two alternatives. One is that the old column values remain unchanged in the encrypted form. The other alternative is to decrypt all the old values, which would require Alice to provide correct decryption key(s). Similarly, when Alice changes a column by enabling the encryption option, she could either leave the old column values alone, or provide a key to encrypt them. A flexible approach can be taken here.

Password Based Encryption

All RDBMSs in the market can authenticate a user through a password mechanism. When a user types in the correct user name with a matching password, he is connected to the server and can start using any database resources he is granted privilege to. The server can always keep a copy of the user password in memory during the session when a user is connected. This password will be used to do any necessary encryption for this particular user. For example, suppose Alice's password is "mypass". When Alice logs in, the database server will get a memory copy of this password. When Alice creates a new customer record by issuing INSERT INTO Customer VALUES (100, "Smith", "John", "1111222233334444");

The database server will first encrypt the credit card number with key "mypass" and then store the ciphertext in the table Customer. Later, when Alice wants to get John Smith's credit card number, she runs the command SELECT ccnum FROM Customer WHERE userid=100;

Because Alice must have logged in to run the SELECT statement, the server must have already obtained a copy of Alice's password "mypass". The server will first decrypt the content of column Customer(ccnum) with "mypass" and then return the original card number D("mypass", Customer (ccnum)), where D is the decryption function. A more preferred approach is to use a variation of the user password. When a user logs in, his password is used as a seed to generate a working key that is used in all encryption operations. The advantage of this approach is that the user password is not used directly in the possibly frequent encryption operations. This approach can be pushed even further. For each column, a combination of the table name, column name and the password can serve as the seed for working key generation and thus different columns are protected with different keys. Furthermore, a unique row identifier can be incorporated into the working key generation process so that identical value appeared in the same column but different rows will be encrypted to different ciphertexts.

Public Key Based Encryption

Public key and PKI can be used to do database encryption in a more robust and efficient way. A PKI infrastructure is the basis for the effective use of public key technology. We assume there is a directory service that is consulted by the database server. Whenever needed, the database server can consult with the directory server to obtain a certificate of a public key for a particular user. Stored together with the public key certificate is the matching private key that is encrypted using the user's password. For example, suppose Alice has a certificate CERT_A stored in the directory server. The certificate CERT_A certifies a public key PK_A with a matching private key SK_A. In the directory server, the following record has all the key information for user Alice:

(Alice, CERT_A, E("mypass", SK_A))

Referring again to FIG. 2, when Alice issues the following statement:
INSERT INTO Customer VALUES (100, "Smith", "John", "1111222233334444");

the database server queries the directory server and obtains CERT_A and thus the public key PK_A. PK_A can be used to encrypt a working key Ks that is generated by the system at node 220 in the Figure. The working data encryption key Ks is used to encrypt John Smith's credit card number at node 230 and the ciphertext of the encrypted columns, along with the plaintext of the remaining non-encrypted columns, is written to disk at node 240 of FIG. 2. The data encryption key Ks is itself encrypted using PK_A as shown in node 220 of FIG. 2. The encrypted working key might be stored in the directory server if its generation involves randomness. For example, the working data encryption key can be simply generated as Ks=RAND() and E(PK_A, Ks) will be stored in the directory server, where RAND is a random number generator and E is an encryption function. Later, when Alice wants to read John Smith's credit card number, she first needs to login to the database server. If the login is successful, the database server has a copy of Alice's password that can then be used to fetch her private key SK_A, which in turn can be used to decrypt the encrypted working key. Finally, the working key can be used to decrypt the stored version of the credit card number. When Alice creates another customer record, depending on the design, the database server can use the same working key generated before to encrypt the new credit card number, or it generates a new working key. In the former case, the server can use Alice's password to decrypt and obtain the old working key K. In the later case, the server does key generation and encryption as before. When Alice changes her password, only her private keys need to be re-encrypted and this can be done efficiently.

In the above approach, we use user passwords to encrypt private keys. Following is a modified approach that does not use user passwords. In the directory server, user Alice's key record contains the following information:

(Alice, CERT_A).

When Alice inserts John Smith's record into the Customer table, a working key Ks is generated to encrypt the column Customer(ccnum), and a record of the following form is stored in the directory server:

(Alice, "Customer", "ccnum", E(PK_A, Ks)).

Figure 3:
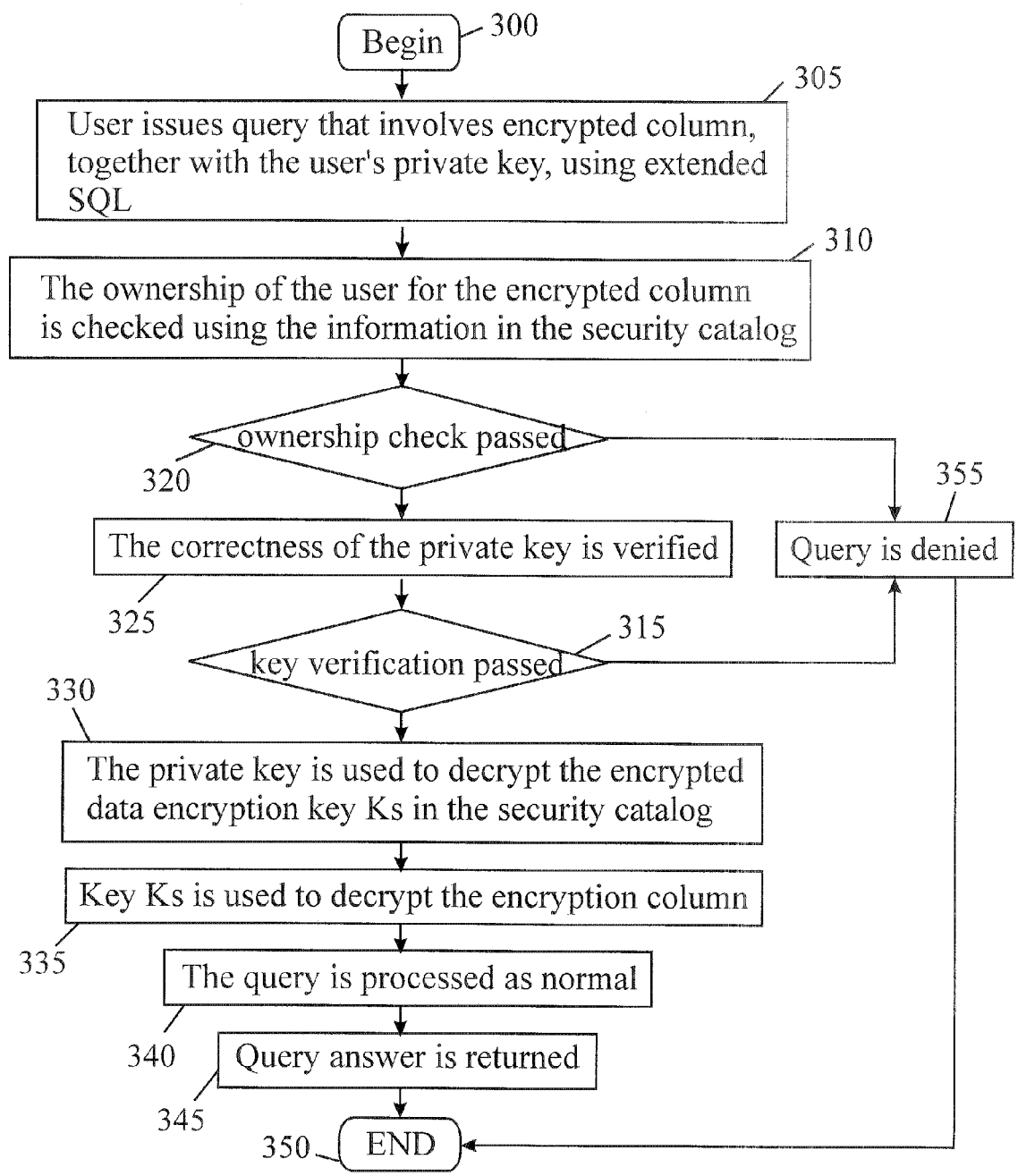
FIG. 3 is a flow diagram of the decryption of data.

Now we describe how the user can access and decrypt an encrypted column. FIG. 3 is the flow diagram for this process.

Referring to FIG. 3 and continuing with our example, when Alice wants to access John Smith's credit card number, she issues the following statement at node 305:

SELECT ccnum FROM Customer WHERE userid=100 PRIVATE KEY SK_A;

That is, Alice explicitly supplies her private key. At node 310 of FIG. 3, the security catalog is used to check the if Alice has the proper ownership of column ccnum. If Alice passes the ownership check at node 320, the correctness of Alice's private key SK_A is verified at node 325. If the key verification is passed (node 315), at node 330, the database server fetches the encrypted working key E(PK_A, Ks) from the directory server and uses the user supplied private key SK_A to decrypt it to obtain the working key Ks. At node 335, the database server uses Ks to decrypt the encrypted credit card number E(Ks, "1111222233334444") and the plain text of the credit card number is obtained. The query is processed normally from now on in node 340, and the result is returned at node 345.

When Alice creates a new customer record, if the design is such that the previously generated working key should be used, Alice needs to supply her private key when doing any insertion:

INSERT INTO Customer VALUES (200, "Case", "Steve", "5555666677778888")
PRIVATE KEY SK_A;

The DB server will fetch E(PK_A, K) from the directory server, decrypt it using the matching private key SK_A to obtain K, and then use K to encrypt the new credit card number.

Encryption Based on User-Supplied Keys

In another embodiment of the invention, a more flexible database encryption approach uses keys dynamically supplied by the users. To accommodate this case, we extend the previous CREATE TABLE statement and add one more option:

CREATE TABLE Customer
(userid INT PRIMARY KEY,
lastname varchar(25),
firstname varchar(25),
ccnum char(16) ENCRYPTION WITH KEY key_value);

When WITH KEY key_value is present, key_value will be the default encryption key when any credit card number is inserted into the table. If a user supplies another key, that key will be used instead. The new SQL statement for this is:

INSERT INTO table_name VALUES value_specification KEYS key_list;

where key_list is a list of keys separated by comma. The list elements correspond to the columns that are to be encrypted. For example, to create a new record for John Smith, Alice would use the following statement:

INSERT INTO Customer
VALUES (100, "Smith", "John", "1111222233334444")
KEYS ("1234567890");

The database server will use the string "1234567890" as key to encrypt the credit card number and store the encrypted version in the database. When Alice wants to access John Smith's credit card number, she issues the following statement:

SELECT ccnum FROM Customer WHERE userid=100
KEYS ("1234567890");

The general form of the extended SELECT statement is as follows:

SELECT projection_list . . . (other clauses) KEYS key_list;

where the elements of the key list correspond to the encrypted columns in the projection list. The approach is self-contained. No directory service or certificate is needed. Basically, the task of key management is shifted to the application server, and the database server only provides the framework to do encryption/decryption. One main advantage of this approach is that it is much easier to integrate with an existing database product.

Group Encryption

The idea and methods previously described can easily be extended and used to deal with the situation when a group of users want to share access to encrypted data.

For example, when Alice creates the table Customer, she may want to allow Bob to be able to read user credit card numbers also. To allow group access to encrypted columns, we can generalize the public key based approach previously described. First, when Alice creates the table Customer, she could explicitly specify who will be allowed to access the unencrypted credit card number, as follows:

---

CREATE TABLE Customer
(userid INT PRIMARY KEY,
Lastname varchar(25),
firstname varchar(25),
creditcardnum char(16) ENCRYPTION
USER user_list UPDATE no);

--- where user_list lists the names of all user that are allowed to access the (unencrypted) credit card numbers. For simplicity, we assume the user list contains only Bob. The security catalog SEC_ENCRYPTION is extended to record this extra information, that is, a record in SEC_ENCRYPTION contains the following information, among others:

(userid=Alice, table=Customer, column=ccnum, enc_flag=no, updateby=Alice, user_list=Bob, user_flag=no)

When Alice creates John Smith's record in table Customer, the encryption is done the same way as before, except that the working key K will be encrypted twice, once using Alice's public key PK_A and once using Bob's public key PK_B, and the following two entries will be stored in the directory server:

(Alice, "Customer", "ccnum", E(PK_A, K))
(Bob, "Customer", "ccnum", E(PK_B, K))

Alice can access the credit card number as before. For Bob, he can supply his own (matching) private key when issuing the following SELECT statement:

SELECT ccnum FROM Customer WHERE userid=100 PRIVATE KEY SK_B;

The database server will first check SEC_ENCRYPTION to see if Bob is the owner of table Customer or listed as a sharing user for (Customer, ccnum). If so, the database server will fetch E(PK_B, K) from the directory server, decrypt it using the user supplied SK_B, and use the recovered working key K to decrypt the encrypted credit card number. Alice can also update the sharing user list later (using ALTER TABLE) because she has specified user_flag=no. When she issues the ALTER TABLE statement, she needs to supply her private key. Similarly, she can grant Bob access to the encrypted column. All the engine needs to do is encrypting the working data encryption key K with the new user's public key. The new catalog SEC_ENCRYPTION and our enhanced user management mechanism together improve the system security. For example, suppose user_flag=no and Alice (the owner of table Customer) is allowed to change the SEC_ENCRYPTION record to add new sharing users for column ccnum.

In the above discussion we assume that users" public key certificates, encrypted private keys and encrypted working keys are stored in a directory service. A better way is to store them locally in the security dictionary. We can use a security catalog SEC_CERT to store all certificates, use a security catalog SEC_WORKINGKEY to store all encrypted working keys, and use a security catalog SEC_PRIVATEKEY to store all encrypted private keys if necessary. The advantage of doing this is two folds. First, a user's public key certificate stored in an independent PKI directory service might change dynamically, but his public key for database encryption is relatively static. Therefore, there is a need for synchronization which might be difficult. Besides, once a public key PK_A is used to encrypt a working key, that working key must be decrypted using a private key that must exactly match PK_A, not any newly updated public key. Thus it is a good practice for the database server to store those public key certificates used for database encryption locally. Second, local storage is good for efficiency reason. Frequent access to an outside directory service would slow down the whole system.

As can be seen, the invention adds encryption as an internal database feature thereby allowing data to be stored in encrypted form and processed efficiently and securely. Because efficient database techniques such as indexes and query optimization are integrated together with the encryption function, the efficiency of the RDBMS remains available to the user.

A typical indexing operation, for example, may be implemented as follows:

1. The server fetches encrypted data pages from storage.
2. The server computes a data encryption/decryption key.
3. The server decrypts the pages.
4. The server builds an indexes of the data.
5. The server computes an indexing key.
6. The server encrypts the index pages
7. The server saves the index pages to disk.

Virtually any other database operation may be substituted for the indexing step. As can be seen, this is made possible because the data is encrypted and decrypted internally.

The invention may be adapted to automation as by, for example, tangibly embodying a program of instructions upon a storage media, such as for example, computer hard disk drives, CD-ROM drives and removable media such as CDs, DVDs, Universal Serial Bus (USB) drives, floppy disks, diskettes and tapes, readable by a machine capable of executing the instructions, such as a computer.

It is to be understood that all physical quantities disclosed herein, unless explicitly indicated otherwise, are not to be construed as exactly equal to the quantity disclosed, but rather about equal to the quantity disclosed. Further, the mere absence of a qualifier such as "about" or the like, is not to be construed as an explicit indication that any such disclosed physical quantity is an exact quantity, irrespective of whether such qualifiers are used with respect to any other physical quantities disclosed herein.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A method of internally encrypting data in a relational database, comprising the steps of:
   providing a database engine having encryption as a database kernel feature;
   providing a security dictionary comprising one or more security catalogs;
   receiving data from a user;
   associating said data with a database column and at least one authorized user;
   generating a working encryption key;
   internally encrypting said working encryption key within said database engine using a public key from an authorized user;
   storing said encrypted working key in a security catalog; and
   internally encrypting said data within said database engine using said working key.

2. The method of claim 1 further comprising the step of generating a private key needed to decrypt said encrypted working key.

3. The method of claim 2 wherein said public key is a password and is used by the system to look up said private key.

4. The method of claim 1 wherein said step of associating said data with a database column and a user is accomplished with an extended SQL syntax and further comprises the step of creating a relational database object comprising:
   the identity of said authorized users;
   a relational database table;

the identity of said column within said relational database table; and one or more security flags, said flags indicating user privileges to access said data.

5. The method of claim 1 wherein said working key is provided by a user.

6. The method of claim 1 wherein said working key is randomly generated.

7. The method of claim 1 further comprising the steps of:
receiving a query and private key from a user;
checking the ownership of an encrypted column using said security catalog to verify the user is authorized;
internally decrypting said encrypted working encryption key with said private key;
internally decrypting said encrypted column with said working key;
processing said query; and
returning an answer to said query to the user.

8. A computer readable medium tangibly embodying a program of instructions executable by a computer to perform method steps for internally encrypting data in a relational database, said method steps comprising:
providing a database engine having encryption as a database kernel feature;
providing a security dictionary comprising one or more security catalogs;
receiving data from a user;
associating said data with a database column and at least one authorized user;
generating a working encryption key;
internally encrypting said working encryption key within said database engine using a public key from an authorized user;
storing said encrypted working key in a security catalog; and
internally encrypting said data within said database engine using said working key.

9. The computer readable medium of claim 8 further comprising the step of generating a private key needed to decrypt said encrypted working key.

10. The computer readable medium of claim 9 wherein said public key is a password and is used by the system to look up said private key.

11. The computer readable medium of claim 8 wherein said step of associating said data with a database column and a user is accomplished with an extended SQL syntax and further comprises the step of creating a relational database object comprising:
the identity of said authorized users; a relational database table;
the identity of said column within said relational database table; and
one or more security flags, said flags indicating user privileges to access said data.

12. The computer readable medium of claim 8 wherein said working key is provided by a user.

13. The computer readable medium of claim 8 wherein said working key is randomly generated.

14. The computer readable medium of claim 8 further comprising the steps of:
receiving a query that involves an encrypted column and a private key from a user;
checking the ownership of the encrypted column using said security catalog to verify the user is authorized;
internally decrypting said encrypted working encryption key with said private key;
internally decrypting said encrypted column with said working key;
processing said query; and
returning an answer to said query to the user.

15. The method of claim 1 further comprising the step of writing the encrypted data into a database disk page, after the step of internally encrypting said data within said database engine using said working key.

16. The computer readable medium of claim 8 further comprising the step of writing the encrypted data into a database disk page, after the step of internally encrypting said data within said database engine using said working key.

17. A method of internally creating an index for encrypted data, comprising the steps of:
fetching encrypted data pages from storage;
computing a data encryption/decryption key;
decrypting the data to form plaintext data pages;
using said plaintext data pages, building an index and forming index pages; and
encrypting said index pages.

18. A method of extending the core SQL statements to integrate encryption as a core feature into a relational database system, comprising the steps of:
adding ENCRYPTION clause to a CREATE TABLE statement;
adding USER clause to the CREATE TABLE statement;
adding ENCRYPTION clause to an ALTER TABLE statement;
adding KEY clause to an INSERT statement;
adding KEY clause to a SELECT statement;
adding UPDATE clause to a CREATE USER statement; and
modifying core SQL statements to integrate encryption and key management as a core database feature supported internally by query compilation and execution components of a database system.

* * * * *